June 10, 1958  J. G. MITCHELL  2,838,489
METHOD OF HARDENING CELLULOSE ACETATE AND
APPARATUS SUITABLE THEREFOR
Filed Sept. 15, 1954  3 Sheets-Sheet 1

INVENTOR.
JOHN G. MITCHELL
BY
ATTORNEYS

INVENTOR.
John G. Mitchell
BY
ATTORNEY

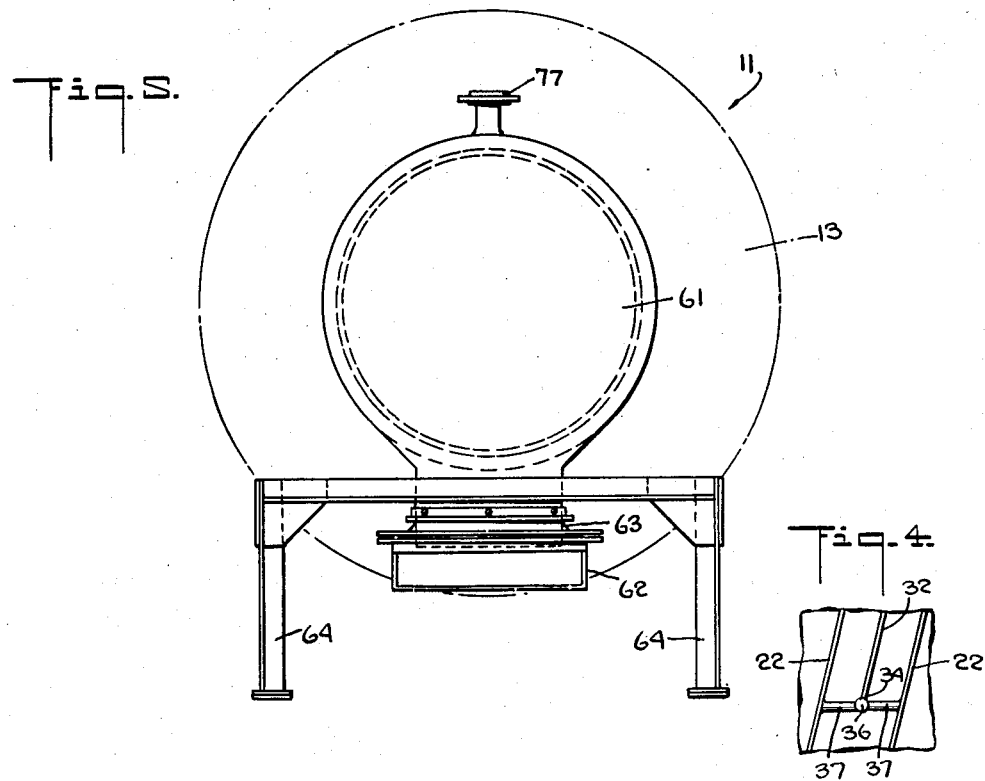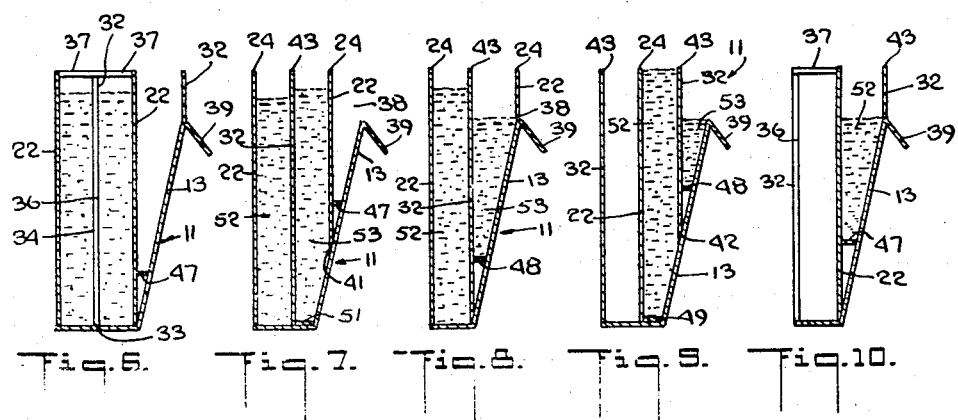

United States Patent Office 2,838,489
Patented June 10, 1958

2,838,489

METHOD OF HARDENING CELLULOSE ACETATE AND APPARATUS SUITABLE THEREFOR

John G. Mitchell, Charlotte, N. C., assignor to Celanese Corporation of America, New York, N. Y., a corporation of Delaware Application September 15, 1954, Serial No. 456,244

13 Claims. (Cl. 260—230)

This invention relates to the treatment of fluent materials such as liquids, finely divided solids or mixtures of the same, and relates more particularly to apparatus and processes for the hardening of cellulose acetate.

In the manufacture of cellulose acetate it is customary to react cellulose with acetic anhydride in the presence of a catalyst, such as sulfuric acid, and a solvent, such as acetic acid, to produce a solution of cellulose acetate. This solution is then ripened to split off, by hydrolysis, a portion of the acetyl groups from the cellulose acetate, following which the cellulose acetate is precipitated in fibrous or flake form by the addition of aqueous acetic acid to the ripened solution of cellulose acetate. The precipitated fibers or flakes of cellulose acetate are then allowed to harden in contact with the aqueous acetic acid to insure that precipitation is complete and substantially no solvent or catalyst remains in said fibers or flakes. After the hardening treatment the cellulose acetate is washed with water.

It is an object of this invention to provide a novel apparatus and process for the continuous hardening of cellulose acetate efficiently, economically, and uniformly.

Another object of this invention is to provide a novel apparatus for the treatment of fluent materials.

Other objects of this invention will be apparent from the following detailed description and claims.

In accordance with this invention cellulose acetate is precipitated continuously, in a known manner, by adding aqueous acetic acid to a ripened solution of cellulose acetate and the resulting slurry, or mixture of cellulose acetate fibers or flakes and liquid, is passed directly in a continuous stream to one end of a rotating hardening tank. In the hardening tank the continuous stream of the mixture is divided into successive separate batches and the batches are moved in separated condition along the length of said tank while hardening of the cellulose acetate takes place, following which the mixture is discharged from the tank. The construction and arrangement of the tank is such that all the fibers or flakes of cellulose acetate are subjected to the hardening treatment for substantially the same period of time.

Figure 1:
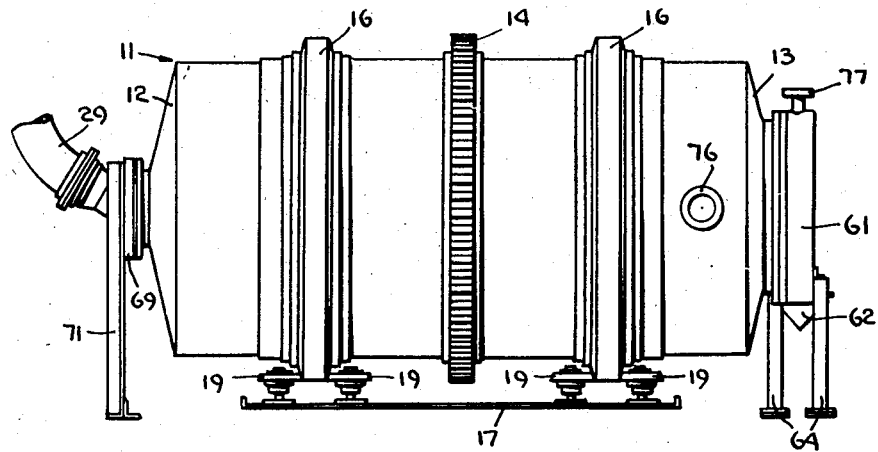
Figure 3:
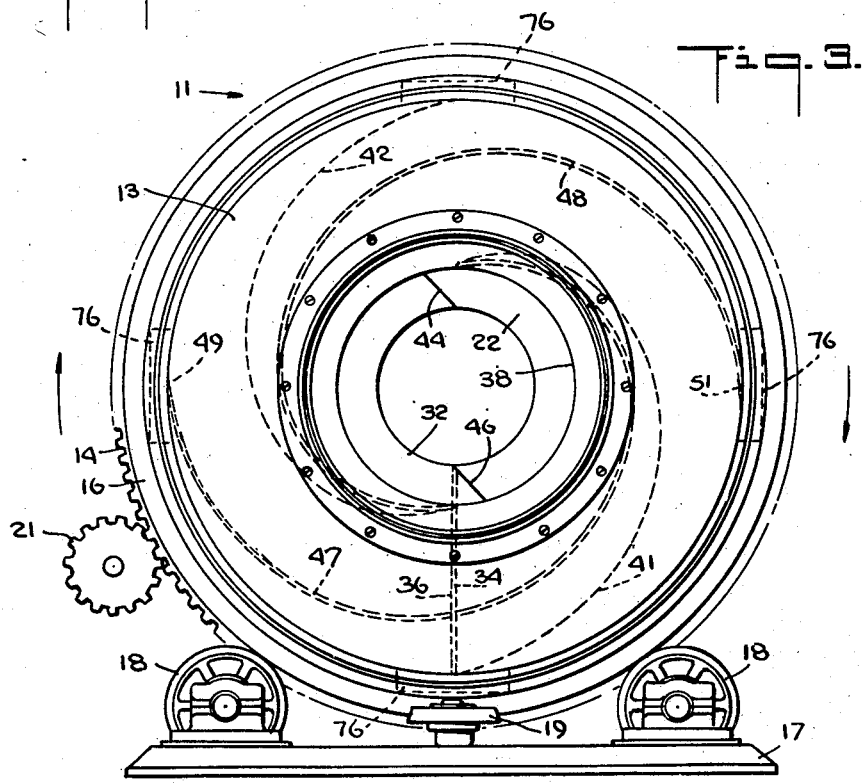
Figure 2:
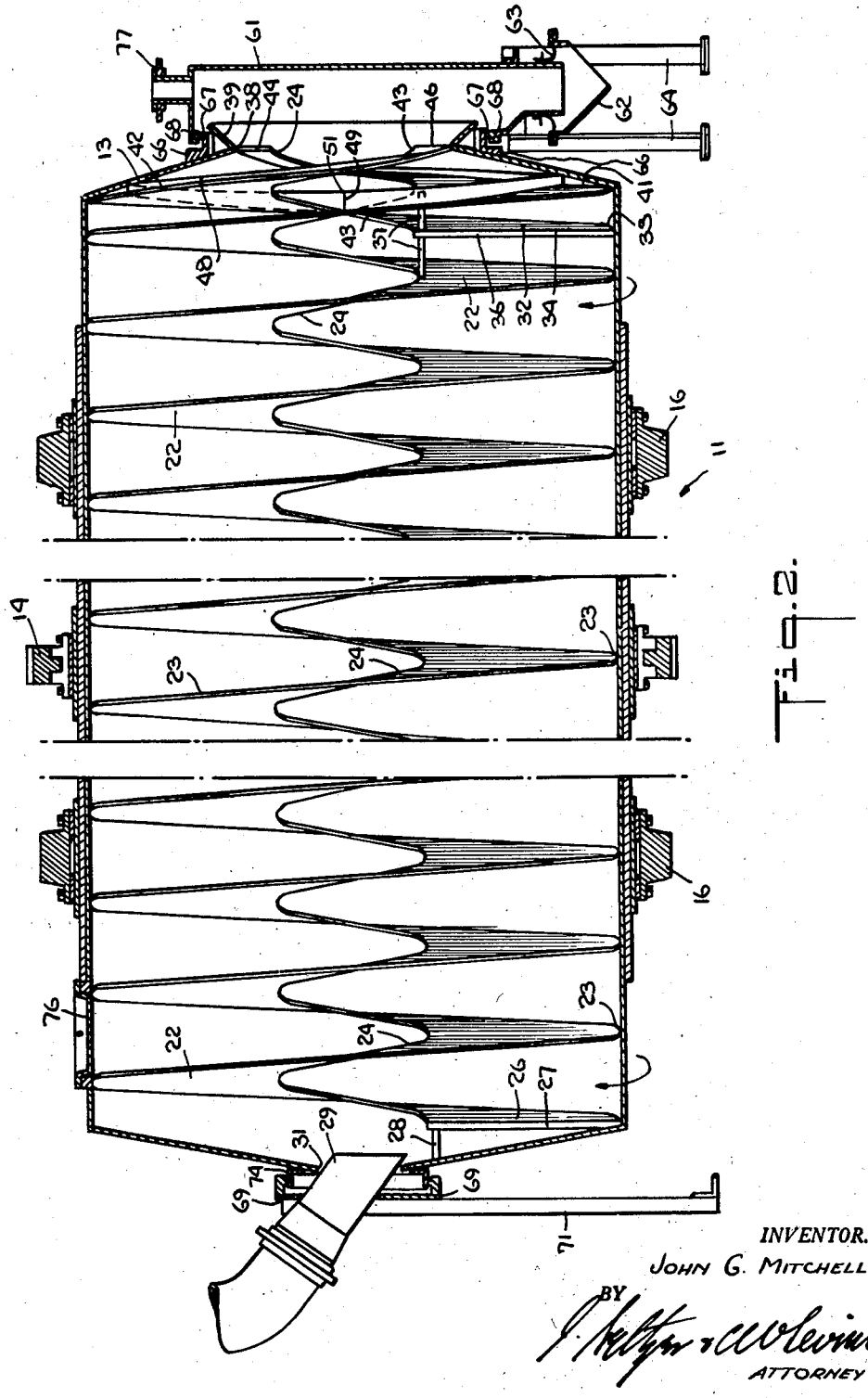

One form of the apparatus of this invention is illustrated in the accompanying drawings in which Fig. 1 is a side view of the hardening tank and associated inlet pipe and outlet chute, Fig. 2 is a vertical cross-sectional view of the apparatus shown in Fig. 1, taken along its horizontal axis, Fig. 3 is an end view of the hardening tank, looking from the discharge end thereof, Fig. 4 is a detail view of a portion of the interior of the tank, Fig. 5 is an end view, showing the outlet chute attached to the discharge end of the tank, and Figs. 6, 7, 8, 9 and 10 are cross-sectional views of the lower portion of the discharge end of the hardening tank, showing various stages thereof during the rotation of said tank.

Like reference numerals indicate like parts throughout the several views of the drawing.

Referring now to the drawings, reference numeral 11 designates generally a hollow tank, having the shape of a horizontal cylinder with frusto-conical end walls 12 and 13, mounted for rotation about a horizontal axis. The tank 11, which is provided with a circumferential ring gear 14 and a pair of spaced circumferential tires 16, is supported on a base 17 in such a maner that the tires 16 are in engagement with freely rotatable wheels 18 (Fig. 3) and rollers 19 carried by said base 17, while the tank is rotated, in the direction shown by the arrows in Figs. 2 and 3, by the engagement of a driven gear 21 (Fig. 3) with said ring gear 14.

Within the tank 11 there is provided a continuous spiral, or helical, vane 22 (see Fig. 2) which makes a plurality of turns, or convolutions, of uniform pitch along the length of the tank, the outer diameter of the vane 22 being substantially equal to the inner diameter of the tank 11. The vane 22 is preferably formed of sheet metal and is fixed to the inside of the tank 11 all along the length of said vane in any suitable manner, as by welding the outer edge 23 of said vane to the walls of the tank continuously along the junction of the outer edge of said vane and said walls. The central portion of the vane, adjacent to the axis of the tank, is open, the inner edge 24 of said vane being so shaped as to form a helix of uniform diameter and uniform pitch along the length of said vane.

The beginning of the vane 22, that is, the portion of the vane closest to the end wall 12, is formed with an edge 26 (see Fig. 2) extending radially of the tank. In order to support this portion of the vane securely, there is provided a reinforcing rod 27, also extending radially of the tank, which rod is welded to the said radial edge 26. This reinforcing rod 27 is also welded to the inner surface of the tank 11 and to one end of a horizontal rod 28. The other end of the horizontal rod 28 is welded to the frusto-conical end wall 12 of the tank.

The material to be treated is fed in a continuous stream to the inlet end of the tank 11 by means of a pipe 29, which passes through an opening 31 in the end wall 12 of the tank. As the tank rotates, this material is moved along the tank from left to right, as viewed in Fig. 2, by the action of the vane 22, which rotates with said tank. The rate of rotation of the tank and the rate of supply of the material to be treated therein are so correlated that the level of the material in the tank never rises above the inner edge 24 of the vane 22. Accordingly, the continuously fed material passes through the tank in the form of isolated successive batches, there being no substantial intermingling between successive batches during their passage through said tank.

Adjacent to the discharge end of the tank 11 there is provided a second spiral vane 32 (Fig. 2). The external and internal diameters of this second vane 32, as well as the pitch thereof, are the same as those of the first vane 22, but the second vane makes only one complete convolution, or turn, in the tank. The second vane 32 is displaced 180° about the axis of the tank from the first vane 22 so that a view in a cross section through the axis of the tank (see Fig. 6) will show the second vane 32 midway between adjacent convolutions of the first vane 22. The second vane 32, like the first, is welded continuously along its outer edge 33 to the inner surface of the tank. The beginning of the second vane 32, that is, the portion of the second vane furthest from the discharge end of the tank, is formed with an edge 34 extending radially of the tank (see also Fig. 4), and, like the beginning of the first vane 22, is reinforced by a radial rod 36 welded to said radial edge 34. The radial rod 36 is welded also to the inner surface of the tank 11 and to a pair of horizontal rods 37 which are secured, as by welding, to adjacent convolutions of said first vane 22.

As stated, the end wall 13 of the tank is frusto-conical in shape. This end wall 13 is provided with a circular outlet opening 38 and with an annular outlet lip 39 of reversed frusto-conical shape welded to said end wall 13 at said opening. Both of the vanes 32 and 22 extend to the outlet opening 38. The vanes 22 and 32 therefore meet the inner surface of the frusto-conical end wall 13 along lines 41 and 42, respectively (see Fig. 3), which lines are spirals whose diameter decreases as they approach the outlet opening 38. The diameters of the inner edges 24 and 43 (Fig. 2) of the vanes 22 and 32, respectively, are smaller than the diameter of the outlet opening 38. At the outlet opening 38 the vanes 22 and 32 are formed with outlet edges 44 and 46, respectively (see Fig. 3 and also Fig. 2), extending along chords of the circle defining said outlet opening.

Between the vanes 22 and 32 and the end wall 13 there are welded two continuous strips of sheet metal, hereinafter called "scoops," 47 and 48, one for each vane, each of said scoops being in the form of a continuous spiral, decreasing in diameter as the outlet opening of the tank is approached, as shown in Fig. 2. The scoops 47 and 48 are so positioned that any cross-section taken through the axis of the tank will show the scoops as parallel to said axis (see Figs. 6 to 10). Those ends 49 and 51 (Fig. 3 and also Fig. 2) of the scoops 47 and 48, respectively, which are furthest from the axis of the tank are seal-welded to the inner surface of said tank. In the embodiment illustrated in the drawing (see Fig. 3) the said ends 49 and 51 are spaced 90° in advance of the points where the corresponding vanes 22 and 32, respectively, first intersect the end wall 13 of the tank. Thus, as the tank rotates, in the direction shown by the arrows in Fig. 3, each successive batch of material approaching the discharge end of the tank will be raised by the scoops 47 and 48 and discharged from the outlet opening 38.

Because of the construction and arrangement at the outlet end of the tank the discharge of the separate batches of material from the tank takes place in a continuous and substantially uniform manner. This may be more easily understood by a consideration of the discharge of a single batch of material from the tank, said batch being shown by shading in Figs. 6, 7, 8, 9 and 10, which are sections taken vertically through the axis of the tank illustrating the positions of said batch during one cycle of rotation of the tank.

When the tank is in the position shown in Fig. 6, which is the same position as shown in Fig. 3, the whole of the particular batch of material under consideration is situated between two adjacent convolutions of the first vane 22, and the leading edge 34 of the second vane 32 is at the center of said batch.

In Fig. 7 the tank has been rotated 90° from the position shown in Fig. 6 and the batch of material has been divided into two substantially equal portions by the second vane 32, whose leading edge 34 (not shown in Fig. 7) has now become horizontal and level with the axis of the tank. Thus, the material of the batch under consideration has been positioned in two separate compartments 52 and 53. The level of the material in the leading compartment 53 has been raised above the level of the material in the adjacent compartment 52 due to the fact that the effective width of the bottom of said leading compartment 53 is less than the width of the adjacent compartment 52, as will be evident from inspection of Fig. 7.

In Fig. 8 the tank has been rotated 90° from the position shown in Fig. 7 and the material has begun to discharge from the leading compartment 53 past the outlet edge 44 of the vane 22 (see Fig. 3) through the outlet opening 38 and over the outlet lip 39. The level of the material in the adjacent compartment 52 has been raised slightly above the level of said material in said compartment 52 in Fig. 7, due to the fact that the effective width of the bottom portion of said compartment 52 has begun to decrease. That is, looking in a direction towards the section shown in Fig. 8, the material which is in said compartment 52 and is behind the section shown in Fig. 8 has come into contact with the conical end wall 13 of the tank.

In Fig. 9 the tank has been rotated another 90°, the discharge of material from the leading compartment 53 has continued, while the level of the material in the adjacent compartment 52 has been raised.

In Fig. 10, wherein the tank has been rotated another 90° making one complete cycle from the position shown in Fig. 6, the material is being discharged from the compartment 52 in the same manner as it was discharged from the compartment 53 in Fig. 7.

As will be apparent from the foregoing, the scoops 47 and 48 are in effect extensions of the vanes 22 and 32, respectively, being so constructed as to keep the material being treated from being trapped in the acute angle between the end wall 13 and the main bodies of said vanes and being so spiralled as to maintain an even rate of discharge of the material from the tank.

In Figs. 6 to 10, the levels of the material shown are those which obtain when the apparatus is operated at its maximum capacity. It will be understood, of course, that the apparatus may be operated at less than its maximum capacity, e. g. by decreasing the rate at which the material is supplied through the feed pipe 29, in which case the levels of the material will be correspondingly lower.

The material leaving from the outlet end of the tank passes through an outlet chute 61 (Figs. 1, 2 and 5) to a duct 62. A rubber diaphragm 63 (Fig. 2) serves to seal the connection between said outlet chute 61 and said duct 62. The outlet chute 61 is supported on standards 64 and is sealed to the end wall 13 of the tank 11 in any suitable manner. In the embodiment shown in the drawing the main body of the outlet chute 61 is generally circular as viewed from the end of the tank 11 (Fig. 5) and is adapted to fit around the outlet lip 39 (see Fig. 2) of said tank. Attached to the end wall 13 of the tank 11 is an annular flange 66 carrying annular packing 67 adapted to engage corresponding annular packing 68 mounted on the outlet chute, said packings 67 and 68 being so constructed, in a manner well known to the art, as to permit the packing 67 to move relatively to the packing 68 while said packings are maintained in sealing contact.

The inlet end of the tank 11 is sealed in a manner analogous to the outlet end. Thus, a stationary collar 69, which supports the inlet pipe 21 and which is in turn supported by standards 71, carries an annular packing adapted to engage a corresponding annular packing mounted on an annular flange 74 secured to the end wall 12.

In order to permit access to the interior of the tank, as for cleaning or repairs thereto, portholes 76 are provided (Fig. 1, 2 or 3) at spaced intervals along the length of said tank. A similar porthole 77 is provided at the top of the outlet chute 61.

As shown, the vane 22 makes a relatively large number of convolutions (e. g. about 10 or more) in the tank. Accordingly, there will be a correspondingly large number of separate batches of material in the tank at any given moment and each batch will consist of the amount of material which has flowed into the tank from pipe 29 in a relatively short period of time, as compared with the total residence time in the tank. Thus, in one example, a liquid precipitation mixture, or slurry, containing fibers or flakes of cellulose acetate together with aqueous acetic acid, the fibers or flakes being evenly distributed in the aqueous acid, is fed continuously to a tank having a vane which makes 12 convolutions in the tank, and the tank is rotated at 4 revolutions per minute. Accordingly, the total hardening time in the tank is about 3 minutes (i. e. 12 divided by 4). In this case each of the 12 batches of the mixture in the tank contains the amount of material which has flowed into the tank in a period of about ¼ minute (a new batch being formed with each revolution of the tank). Thus, within any given separate batch of slurry approaching the discharge end of the tank the variation in residence time in the tank is only about ¼ minute in a total of 3 minutes. It will therefore be evident that no one fiber or flake of any single batch will be hardened for a much longer or shorter period of time than any other fiber or flake in the same batch. In this connection it should be noted that the time consumed in discharging each batch is also about ¼ minute, since one batch is discharged for each revolution of the tank. Thus, that portion of each batch of material which is discharged last will be retained in the tank for about ¼ minute longer than that portion of the same batch of slurry which is discharged first. Accordingly, there will be a slight cyclical variation in the average extent of hardening of the material discharged from the tank.

It is to be understood that the foregoing detailed description is merely given by way of illustration and that many variations may be made therein without departing from the spirit of my invention.

Having described my invention, what I desire to secure by Letters Patent is:

1. In a treating apparatus, a vessel having an inlet and an outlet at opposite ends thereof, means for supplying a continuous stream of a flowable material to the inlet of said vessel, and means for dividing said continuous stream into successive separate batches and for moving said batches in separated condition along the length of said vessel from said inlet to said outlet, said means including a rotatable spiral vane mounted in said vessel, said vane having a plurality of convolutions for maintaining said batches separate and for moving said batches along the length of said vessel as said vane rotates, and a second spiral vane pitched in the same direction as said first vane and interlaced therewith, said second vane extending from the outlet end of said vessel to a point adjacent to said outlet end.

2. In a treating apparatus, a vessel, having an inlet and an outlet at opposite ends thereof, means for supplying a continuous stream of a flowable material to the inlet of said vessel, and means for dividing said continuous stream into successive separate batches and for moving said batches in separated condition along the length of said vessel from said inlet to said outlet, said means including a rotatable spiral vane mounted in said vessel, said vane having a plurality of convolutions for maintaining said batches separate and for moving said batches along the length of said vessel as said vane rotates, said outlet being an opening in an end wall of said vessel and being aligned with the axis of rotation thereof, said end wall being tapered inwardly toward said opening in the direction of the movement of said batches, said vane extending operatively into contact with said end wall along a line which is substantially a spiral whose diameter decreases as it approaches said opening, whereby to move said flowable material towards said axis of rotation and through said opening, said vane being so formed as to approach operatively said line in a direction substantially parallel to said axis.

3. In a treating apparatus, a horizontal cylindrical vessel rotatable about a horizontal axis and having an inlet at one end and an outlet at its other end, means for supplying a flowable material to the inlet end of said vessel and means for dividing said material into a plurality of separate batches and for moving said batches in separated condition along the length of said vessel to the discharge end thereof, said means including a spiral vane in said vessel and connected thereto for rotation therewith, said vane having a plurality of convolutions for maintaining said batches separate and for moving said batches along the length of said vessel as said vane rotates, said outlet being an opening in an end wall of said vessel and being aligned with the axis of rotation thereof, said end wall being tapered inwardly toward said opening in the direction of the movement of said batches, said vane extending operatively into contact with said end wall along a line which is substantially a spiral whose diameter decreases as it approaches said opening, whereby to move said flowable material towards said axis of rotation and through said opening, said vane being so formed as to approach operatively said line in a direction substantially parallel to said axis.

4. In a treating apparatus, a horizontal cylindrical vessel rotatable about a horizontal axis and having an inlet at one end and an outlet at its other end, means for supplying a flowable material to the inlet end of said vessel and means for dividing said material into a plurality of separate batches and for moving said batches in separated condition along the length of said vessel to the discharge end thereof, said means including a spiral vane in said vessel and connected thereto for rotation therewith, said vane having a plurality of convolutions for maintaining said batches separate and for moving said batches along the length of said vessel as said vane rotates, and a second spiral vane pitched in the same direction as said first vane and interlaced therewith and mounted for rotation therewith, said second vane extending from the outlet end of said vessel to a point adjacent to said outlet end for dividing each batch of material into successive separate portions as said batch approaches said outlet end and for maintaining said portions substantially separate during the discharge of said batch from said vessel.

5. Apparatus as set forth in claim 4 in which said outlet is an opening in an end wall of said vessel and is aligned with the axis of rotation thereof and each of said vanes extends into contact with said end wall substantially along a line which is a spiral whose diameter decreases as it approaches said opening whereby to move said flowable material towards said axis of rotation and through said opening.

6. Apparatus as set forth in claim 5 in which said end wall is frusto-conical in shape and is substantially symmetrical about said axis, and said vanes are so formed as to operatively approach said line along a plane substantially parallel to said axis.

7. Apparatus as set forth in claim 6 in which each of said vanes comprises a member arranged generally perpendicular to said axis and a spiral scoop arranged generally parallel to said axis and extending between said member and said end wall.

8. Apparatus as set forth in claim 5 in which said end wall is frusto-conical in shape and substantially symmetrical about said axis, said outlet opening in said end wall is circular, and each of said vanes is formed with an inner edge having the shape of a helix of substantially uniform diameter along the length of said vane, the diameter of each of said inner edges being less than the diameter of said outlet opening.

9. Apparatus as set forth in claim 8 in which each of said vanes is formed with an edge adjacent said outlet opening and running along a chord of the circle of said outlet opening.

10. Apparatus as set forth in claim 8 in which said second vane makes one convolution in said vessel.

11. Apparatus as set forth in claim 10 in which there are struts extending from opposite sides of said second vane to adjacent convolutions of said first vane for supporting said second vane between said adjacent convolutions.

12. In a treating apparatus, a vessel having an inlet and an outlet at opposite ends thereof, means for supplying a continuous stream of a flowable material to the inlet of said vessel, and means for dividing said continuous stream into successive separate batches and for moving said batches in separated condition along the length of said vessel from said inlet to said outlet, said means including a rotatable spiral vane mounted in said vessel, said vane having a plurality of convolutions for maintaining said batches separate and for moving said batches along the length of said vessel as said vane rotates, and a second spiral vane pitched in the same direction as said first vane and interlaced therewith and mounted for rotation therewith, said second vane extending from the outlet end of said vessel to a point adjacent to said outlet end for dividing each batch of material into successive separate portions as said batch approaches said outlet end and for maintaining said portions substantially separate during the discharge of said batch from said vessel.

13. Process for hardening cellulose acetate directly after continuously precipitating the same from a solution thereof which comprises supplying a continuous stream of a mixture of precipitated cellulose acetate and precipitating medium therefor, continuously dividing said stream into successive separate batches, and passing said batches continuously and successively through a hardening zone while maintaining each of said batches substantially separate from the succeeding batch.

References Cited in the file of this patent

UNITED STATES PATENTS

| | | |
|---|---|---|
| 888,685 | Arnold | May 26, 1908 |
| 1,485,507 | Juer | Mar. 4, 1924 |
| 2,208,637 | Jones et al. | July 23, 1940 |
| 2,239,753 | Martin | Apr. 29, 1941 |